(12) United States Patent
Carullo et al.

(10) Patent No.: US 12,055,902 B2
(45) Date of Patent: *Aug. 6, 2024

(54) FAILURE MODE ANALYTICS

(71) Applicant: SAP SE, Walldorf (DE)

(72) Inventors: Lukas Carullo, Menlo Park, CA (US); Patrick Brose, San Francisco, CA (US); Kun Bao, Sunnyvale, CA (US); Anubhav Bhatia, Sunnyvale, CA (US); Rashmi Shetty B, San Ramon, CA (US); Leonard Brzezinski, San Jose, CA (US); Lauren McMullen, El Dorado Hills, CA (US); Harpreet Singh, Fremont, CA (US); Karthik Mohan Mokashi, San Ramon, CA (US); Simon Lee, San Ramon, CA (US)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,080

(22) Filed: Jan. 12, 2023

(65) Prior Publication Data
US 2023/0168639 A1    Jun. 1, 2023

Related U.S. Application Data

(63) Continuation of application No. 16/284,369, filed on Feb. 25, 2019, now Pat. No. 11,567,460.

(51) Int. Cl.
*G05B 13/02* (2006.01)
*G06F 9/54* (2006.01)
(Continued)

(52) U.S. Cl.
CPC ......... *G05B 13/0265* (2013.01); *G06F 9/542* (2013.01); *G06N 7/01* (2023.01); *G06N 20/20* (2019.01)

(58) Field of Classification Search
CPC .. G06F 21/554; G06F 21/566; G06F 11/3476; G06F 11/0793; G06F 11/079; G06N 3/047; G06N 3/045; G06N 3/088
See application file for complete search history.

(56) References Cited

U.S. PATENT DOCUMENTS

| 11,010,233 B1 * | 5/2021 | Golden ................ G06F 21/554 |
| 2018/0114177 A1 * | 4/2018 | Somech ........ G06Q 10/063118 |

(Continued)

OTHER PUBLICATIONS

892 Form dated Jul. 21, 2022 which was issued in connection with U.S. Appl. No. 16/284,369.

(Continued)

*Primary Examiner* — Mahran Y Abu Roumi
(74) *Attorney, Agent, or Firm* — Buckley, Maschoff & Talwalkar LLC

(57) ABSTRACT

Provided is a system and method for training and validating models in a machine learning pipeline for failure mode analytics. The machine learning pipeline may include an unsupervised training phase, a validation phase and a supervised training and scoring phase. In one example, the method may include receiving a request to create a machine learning model for failure mode detection associated with an asset, retrieving historical notification data of the asset, generating an unsupervised machine learning model via unsupervised learning on the historical notification data, wherein the unsupervised learning comprises identifying failure topics from text included in the historical notification data and mapping the identified failure topics to a plurality of predefined failure modes for the asset, and storing the generated unsupervised machine learning model via a storage device.

17 Claims, 11 Drawing Sheets

(51) Int. Cl.
*G06N 7/01* (2023.01)
*G06N 20/20* (2019.01)

(56) References Cited

U.S. PATENT DOCUMENTS

| | | | |
|---|---|---|---|
| 2020/0201916 A1* | 6/2020 | Moore | G06F 16/90335 |
| 2020/0233397 A1* | 7/2020 | Bello | G05B 19/4184 |
| 2020/0241490 A1* | 7/2020 | Jermann | G05B 13/041 |
| 2021/0034581 A1* | 2/2021 | Boven | G06F 16/212 |
| 2022/0100647 A1* | 3/2022 | Hamid | G06F 11/3684 |

OTHER PUBLICATIONS

892 Form dated Nov. 9, 2022 which was issued in connection with U.S. Appl. No. 16/284,369.
Notice of Allowance dated Nov. 9, 2022 which was received in connection with U.S. Appl. No. 16/284,369.

\* cited by examiner (Unsupervised Learning)

(Supervised Learning)

FIG. 4B

Failure Mode Analytics

Top Failure Modes: Jan. 5, 2019 – Feb. 12, 2019

450

Overheating Bearing 452

Occurs in Notifications: 149
More than Average: 142%

KPIs
MTTR: 21 Days
MTTF: N/A
MTBF: N/A

*Details*

Insufficient Flow 454

Occurs in Notifications: 102
More than Average: 177%

KPIs
MTTR: 13 Days
MTTF: N/A
MTBF: N/A

*Details*

Pump Leaking 456

Occurs in Notifications: 99
More than Average: 136%

KPIs
MTTR: N/A
MTTF: N/A
MTBF: 193 Days

*Details*

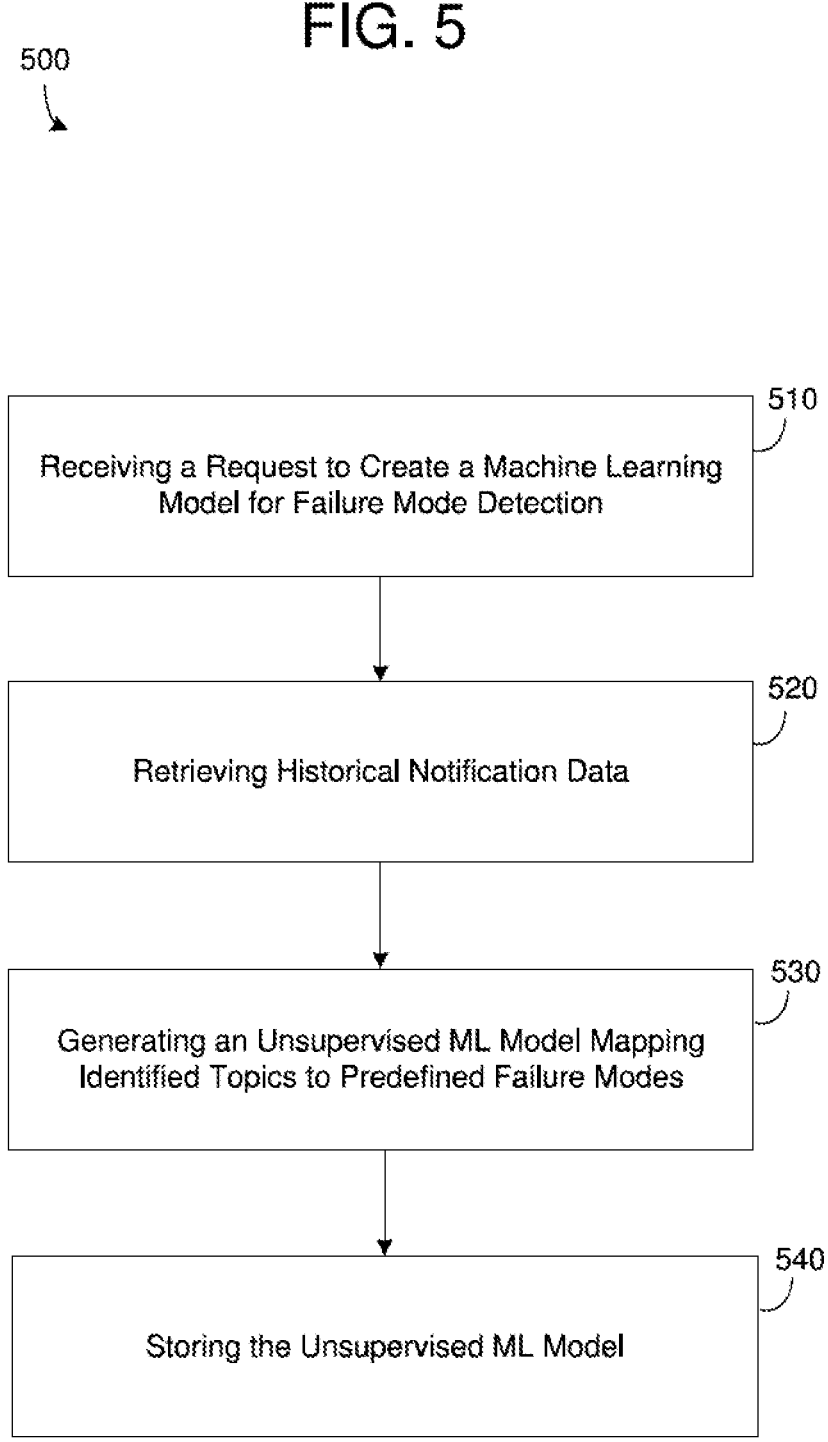

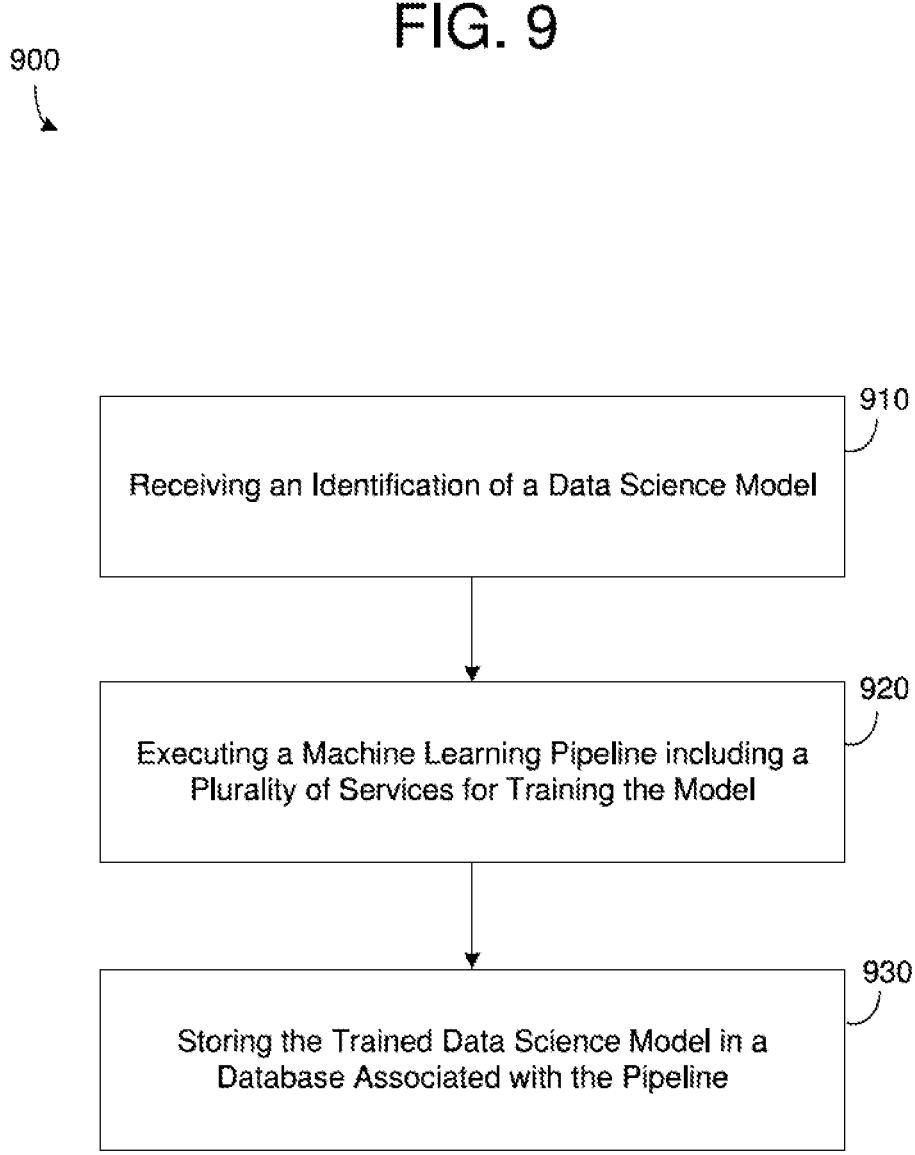

FAILURE MODE ANALYTICS

CROSS-REFERENCE TO RELATED APPLICATION(S)

The present application is a continuation of U.S. patent application Ser. No. 16/284,369, filed on Feb. 25, 2019, in the United States Patent and Trademark Office, the entire disclosure of which is hereby incorporated by reference for all purposes.

BACKGROUND

Physical assets (e.g., machinery and equipment used in industry, manufacture, etc.) must be monitored and maintained to remain working properly. An asset typically has a specific function or task to perform. When an asset fails, the asset may not be able to perform its function with reasonable success or otherwise meet expectations. An asset often has multiple manners in which it can fail. These are referred to as failure modes. For example, when a pump fails to pump a required amount of material this may be referred to as an insufficient flow type of failure mode. As another example, when a pump leaks material this may be referred to as a leakage type of failure mode. When an event (such as a failure) occurs at an asset, a system or an engineer may create a notification of some kind explaining the event. Over time, organizations may store volumes of notification information.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 4B is a diagram illustrating a user interface showing insights of a scored text classification in accordance with an example embodiment.

FIG. 5 is a diagram illustrating a method for generating a model for failure mode analytics in accordance with an example embodiment.

FIG. 9 is a diagram illustrating a method for training a model via a machine learning pipeline according to example embodiments.

Figure 1:
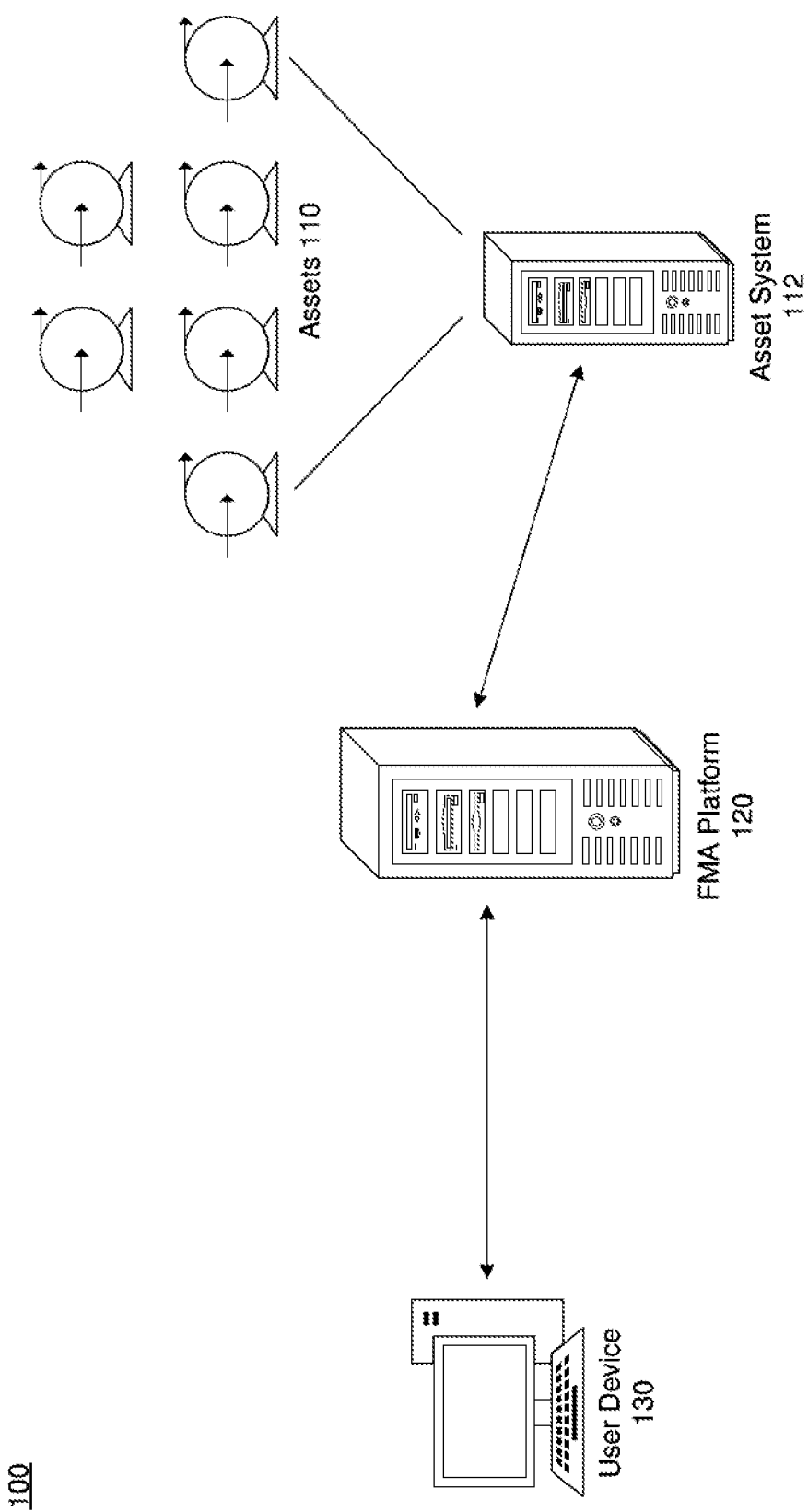
FIG. 1 is a diagram illustrating a failure mode analytic (FMA) system 100 in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Organizations that manage assets may have years of data that is collected from their machines or equipment. Buried within the years of data may include failure-related notifications involving events associated with the asset (e.g., maintenance performed, error code displays, customer complaints, part replacements, work orders, etc.) However, this valuable information is often hidden within millions of lines of text (e.g., within free-form text within the notifications and work orders, etc.) which makes it difficult if not impossible to analyze how often a particular failure occurred in the past, or if there is equipment in their fleet that perhaps has a higher occurrence of failure than others. Therefore, even though an organization may have vast knowledge about their assets, they cannot use the knowledge in a meaningful way to improve their business.

The example embodiments provide a system for failure mode analytics which can create actionable knowledge from historical data. The system provides a mechanism by which a user can build a machine learning model for failure mode analysis based on their historical data, train the model, validate the model, and score the model to determine its effectiveness. During an unsupervised learning stage, the system may train a topic model (e.g., a newly created model or update an existing model) for failure mode analysis based on the historical asset data. The system may use machine learning to extract topics from the historical data based on textual information in the existing notifications and match the topics to predefined failure modes for such asset (e.g., asset-specific failure modes). The unsupervised model for failure mode analysis may be stored in a database for access.

According to various aspects, the system provides a user interface that enables users (e.g., subject matter experts, reliability engineers, etc.) to validate the unsupervised model for failure mode analysis and make modifications, if necessary. For example, the user may double-check the machine learning matches between topics and predefined failure modes, and reassign a topic to a different failure mode. The user interface may also provide information about each topic such as an identification of top keywords of a topic, etc. The validated model for failure mode analysis may be scored during a subsequent supervised learning stage. The validated model may be stored in the database for access.

During a second stage, the system can perform supervised learning on the validated model. The supervised learning may be referred to as ensemble learning. During the supervised learning, the system may use the model to predict failure modes associated with notifications. The supervised learning may create mappings on raw data using the model, and also provide insights into the model's quality and effectiveness, through various metrics (e.g., top failure modes, KPIs, etc.). Once the user has achieved a desired result with the model during the supervised learning, the text classification model can be stored and/or provided to a monitoring system for monitoring assets such as a condition-based monitoring platform.

The finished model for failure mode analytics may receive a notification and identify which failure mode the notification belongs to and automatically assigns the best suitable failure mode accordingly. With the help of these assignments, the system can calculate indicators such as MTTF (Mean Time To Failure), MTTR (Mean Time to Repair) and MTBF (Mean Time between Failures). Furthermore, the system may provide the end user with additional details about the failures such as how often which failure mode appeared in notifications for the equipment model and display if a failure mode is detected more than average compared across all equipment of that model.

Some of the benefits of the system described herein include getting value from existing notification data which was previously not possible. Furthermore, the system can analyze historical notification texts and assign the most likely failure mode in a fraction of the time it would take a human to do so manually. The expert validation step further ensures high quality failure mode analysis meaning the results can be fed back into the machine learning engine to automatically assign the correct failure mode to incoming documents using past knowledge. The resulting model enables a proactive maintenance approach that avoids unplanned downtime by timely replacement or maintenance of equipment that is near failure.

FIG. 1 illustrates a failure mode analytic (FMA) system 100 in accordance with an example embodiment. Referring to FIG. 1, the system 100 includes a host platform (i.e., FMA platform 120) which hosts a failure mode analytic application configured to build a model for failure mode analysis which can detect failure modes from data collected from assets 110. According to various embodiments, the FMA platform 120 may analyze notifications and failure modes for an asset (e.g., equipment, equipment model, etc.). The FMA platform 120 may configure, train, and score models via a failure mode analytics model management application which is executing thereon. Through the application, a user may configure and train an unsupervised model and then configure, train, and score a supervised model. The unsupervised model is the basis for the supervised model. The unsupervised model identifies the characteristics of notification texts and maps the notification texts to the characteristics found in standard failure modes. After the training, the application can suggest the most appropriate failure mode for each notification when processing new data.

The application running on the FMA platform 120 may also generate insights into the failures associated with the assets 110. Assets, as described herein, may include machine and equipment used in industry, manufacture, healthcare, and the like. In the example of FIG. 1, the assets 110 are pumps. However, the assets 110 may include different types of assets besides pumps. Non-limiting examples of other asset types include wind turbines, locomotives, aircraft, subways, boats, submersibles, gas stacks, oil and mining equipment, healthcare machines (e.g., MRI, X-ray, etc.), and the like. As another example, the assets described herein may refer to a class of assets (e.g., assets of a same type, model, classification, etc.) The class of assets may be further grouped in sub-categories based on additional attributes of the asset.

Asset data may be collected and forwarded to the FMA platform 120. For example, the asset data may be collected by an asset system 112 configured to receive data from the assets 110. Here, the asset system 112 may include an industrial PC, an asset controller, an intervening edge server, a cloud platform, or the like. As another example, assets themselves may transmit data to the FMA platform 120 via network protocol configured therein. The asset data may be collected to create a corpus of historical failure-related information associated with the assets 110. The corpus may include notifications, work orders, and the like, which include unstructured free-form text that describes information about an asset. For example, the text may include error codes, warnings, customer complaints, notes describing events detected in association with an asset, parts replaced, work orders, engineer service notes, and the like.

According to various embodiments, the FMA platform 120 may be used to configure, train, and validate a topic model for failure mode analytics. The model may go through an unsupervised phase where the application initially learns/maps topics to standard failure modes. The model may be validated by a user to confirm the initial mappings of topics to failures, etc. Then, the model may go through a supervised phase which may include additional configuring, training, and scoring of the model on a new set of data. The generated model can be used to process a new notification and automatically assign the incoming notification to a failure mode from among a plurality of failure modes associated with an asset type. In some embodiments, the generated text classification model may transmitted or incorporated within a monitoring software (e.g., condition based monitoring) which monitors the assets 110 and predicts the occurrences of failure based on patterns of asset data from the assets 110 such as time-series data.

In the example of FIG. 1, a user may interact with the FMA platform 120 via a user device 130. Here, the FMA platform 120 may be a web server, a cloud platform, a database, or the like, and the user device 110 may be a computing system such as a mobile device, a laptop, a PC, etc. which can connect to the FMA platform 120 via the Internet or other network. As another example, the FMA platform 120 and the user device 130 may be integrated together allowing a local user to perform failure mode analytics.

The FMA platform 120 may use machine learning to turn human knowledge contained within texts of notifications from the assets 110 into insights about the nature of failures. This provides the user with insights and analytics about equipment and models with the last occurring failures. As further described below, the FMA platform 120 may use unsupervised and supervised machine learning to extract topics with top words from notification texts and map the extracted topics to standard failure modes for equipment models. The FMA platform 120 may use various metrics and visualizations to provide the user with insights and analytics about equipment and models with the last occurring failures.

For example, a user interface output the user device 110 may include equipment and model pages including failure mode cards that illustrate how often the failure modes appeared in notifications for the equipment model. The FMA platform 120 may also output details of the failure modes that include KPIs for MTTR (Mean Time To Repair), MTTF (Mean Time to Failure), MTBF (Mean Time Between Failure), and the top bad actors. In addition, the FMA platform 120 can identify and output the top words (i.e., keywords) that are found within the notifications for the chosen failure mode and equipment model by relevancy in a bar graph and a list of all related notifications.

Figure 2A:
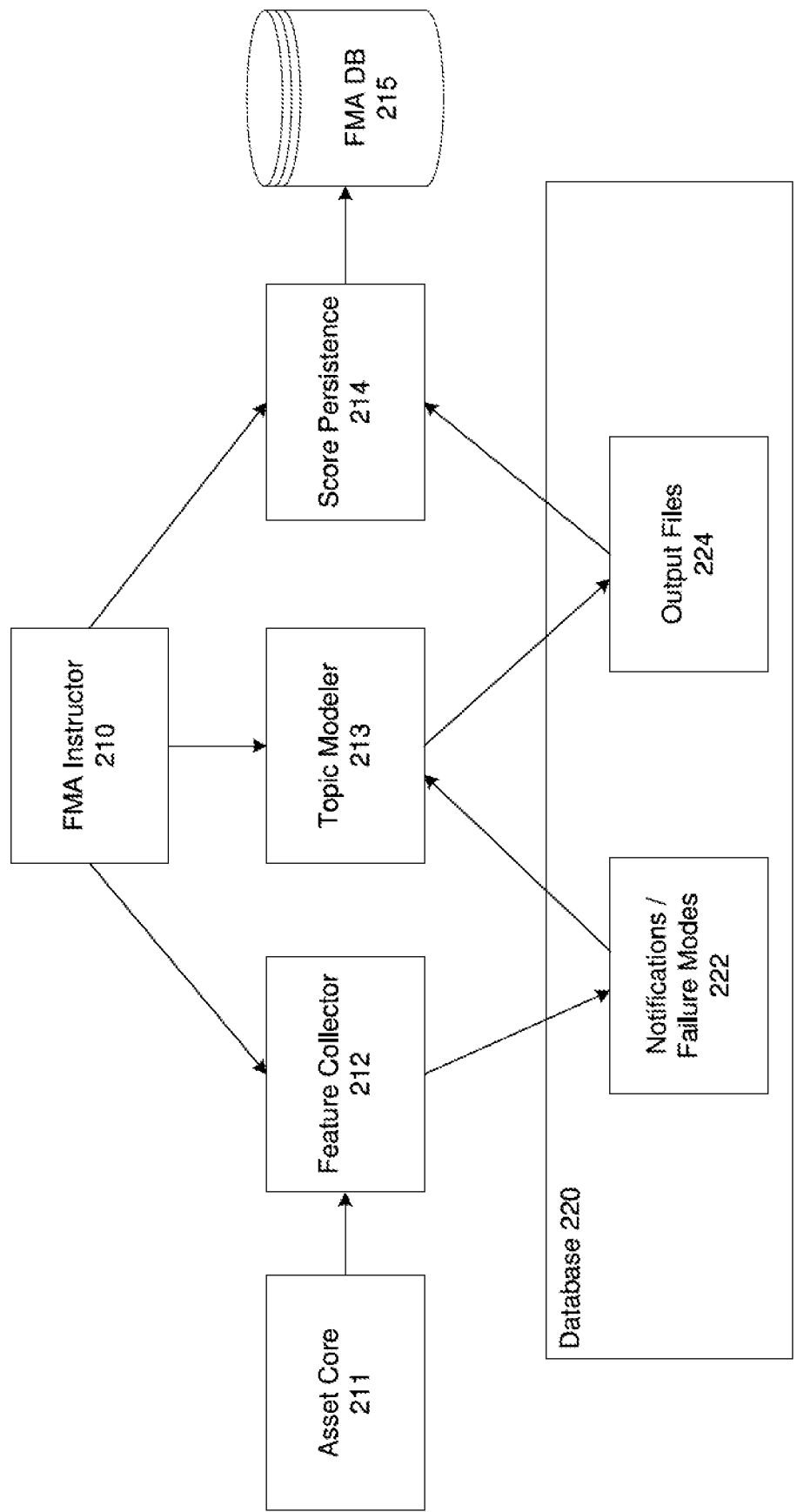
FIG. 2A is a diagram illustrating a system for creating a model for failure mode analytics via unsupervised learning in accordance with an example embodiment.

FIG. 2A illustrates a system 200 for creating a topic model for failure mode analytics via unsupervised learning in accordance with an example embodiment. Referring to FIG. 2A, the system 200 includes an FMA instructor 210 which orchestrates the unsupervised learning process performed by the system 200. The FMA instructor 210 includes instructions for receiving information and triggering a next component of the system. In this example, the FMA instructor 210 may be used to control a feature collector component 212, a topic modeler component 213, a score persistence component 214, and/or the like. Each of the components shown in FIG. 2A may be microservices which are orchestrated through the FMA instructor 210.

During an initial step, the user may choose to build a model or modify a previously created model. The user may enter (or modify) a model name, a description of the model, the equipment model that is used for collecting the training input, and the like. The user may choose an algorithm type and tune its hyperparameters. The algorithms may identify a health of the model's predictive function.

It is also possible that other techniques/algorithms may be implemented by the FMA application. Additional types of processes and predictive models may be used to automate detection and subsequent labeling of failure modes. Examples include, but are not limited to, graph model for text pattern recognition, spectral clustering, ranking causal strength of adjacent sentences, and the like, which could be employed to extract patterns from text. Examples of alternative implementations of supervised text classification include, but are not limited to, Bayesian multinet classification, k-NN LSI, Corner Classification Network, Hierarchical Deep Learning for Text classification, and the like. Furthermore, semi-supervised techniques could be employed to replace a portion of or the entire unsupervised and supervised steps of the pipeline. Examples include, but are not limited to weakly supervised neural text classification, LSTM networks, and the like.

According to various embodiments, once the model is selected, the user may choose a period of time for training data. In response, the FMA instructor 210 may trigger the feature collector 212 to perform a feature collection from different sources of data including asset core 211 which stores notifications, work orders, and the like of the assets. The data may be collected from a starting time period and an ending time period set forth by the user. When the system starts training, the FMA instructor 210 may trigger the feature collector 212 to read notifications/work orders from a historical data store (asset core 211, etc.) and acquire data from a particular time range. Once it gets this data, the FMA instructor 210 may trigger the feature collector 212 to hold the data or store the collected data in a temporary storage area 222 within a database 220.

Figure 2B:
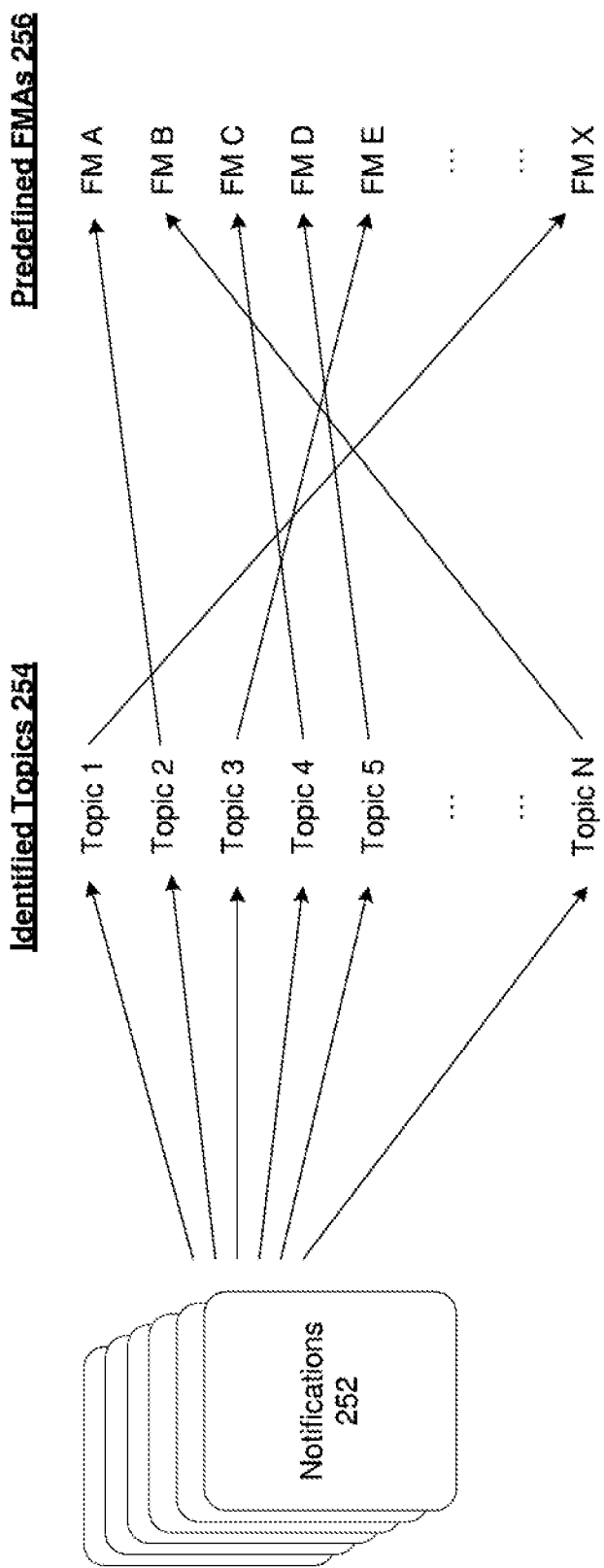
FIG. 2B is a diagram illustrating a process of mapping topics to predefined failure modes in accordance with an example embodiment.

Next, the FMA instructor 210 may trigger the topic modeler component 213 to identify topics from within the notifications and map the identified topics to predefined failure modes. In this example, the topic modeler component 213 may be based on a semantic model that includes attributes for equipment, algorithm, stop words, and the like, which can be used to identify topics from the historical data. The topic modeler component 213 may calculate results based on the collected data. These results create output files 224 which are what can be consumed in various ways. The output files 224 may include a log of notifications which are used for the training, the failure modes identified from the notifications, and additional details such as top failure modes, and the like. FIG. 2B illustrates a process 250 of mapping topics 254 identified from notifications 252 of historical asset data to predefined failure modes 256, in accordance with an example embodiment.

The training run starts, and may show the status in a trainings table via a user interface. Once the training run is completed, the system may generate and output detailed information and the training job ID by clicking on a log entries in a log summary column. For the unsupervised topic model, a quality metric may be displayed in the log summary. For example, the quality metric may include a perplexity value that indicates how well a probability model predicts a sample and is used by the convention in language modeling. A low perplexity indicates that the probability distribution is good at predicting the sample. The lower the perplexity score, the better the generalization performance.

As an example, the process 250 may use Latent Dirichlet Allocation (LDA), which is a generative probabilistic method for modeling a corpus (e.g., notifications 252). The corpus here could be text from notifications 252 collected by the feature collector component 212 shown in FIG. 2A. Latent Dirichlet Allocation assigns topics 254 to documents and generates topic distributions over words given a collection of texts, thus providing a way of automatically discovering topics those documents contain. The LDA model is a Bayesian mixture model for discrete data where the topics 254 may be assumed to be uncorrelated. LDA assumes that each document can be represented as a probabilistic distribution over latent topics 254, and that topic distribution in all documents share a common Dirichlet prior. Each latent topic in the LDA model is also represented as a probabilistic distribution over words and the word distributions of topics share a common Dirichlet prior as well.

The algorithm implemented by the topic modeler component 213 fits a topic model to the input text data. For this, text data that makes up the corpus is specified. Training a model extracts the latent topics 254 given a set of documents (notification 252). Likewise, scoring would essentially be to infer underlying topics that explain a specific document based on the generative process which was used to train the model; basically, infer the conditional distribution (posterior) of the hidden variables given the observed variables. The topics 254 are mapped to predefined failure modes 256 such as those defined by a standard for a given asset. The failure modes 256 may be asset-specific and therefore may be different for each type of asset. The mapping may be performed via a similarity analysis between text of the topics 254 and text of the failure modes 256, or some other analysis. In some embodiments, topics 254 may be one-to-one mapped to failure modes 256. As another example, multiple topics 254 may be mapped to a same failure mode, etc.

Referring again to FIG. 2A, training for LDA means using the provided historical training text data from the feature collection component 212 to learn a topic model for failure mode assignment. The topic modeler 213 may find a model that well represents the data set used for training. Internally, this algorithm splits the data into a train and test set, using 90% of the data for the training. After a training, a quality metric calculated on the test set may be displayed in a log summary in a trainings table. Next, the FMA instructor 210 may instruct the score persistence component 214 to parse the results output by the topic modeler component 213, store the results in namespace tables in an FMA database 215. The resulting model is then stored for use with a supervised learning stage as described in the example of FIG. 4.

To improve the accuracy of the text analysis that maps topics with top words from notification texts to the most appropriate failure modes, the system may output a user interface that allows or enables a user to perform validation tasks. Validation tasks are generated based on a trained unsupervised model and are displayed on the failure mode analytics validation application. Once a user has performed a validation task, the system can apply the validation to the next supervised model training and scoring run in the failure mode analytics model management application and check the validation results for failure mode analytics.

Figure 3:
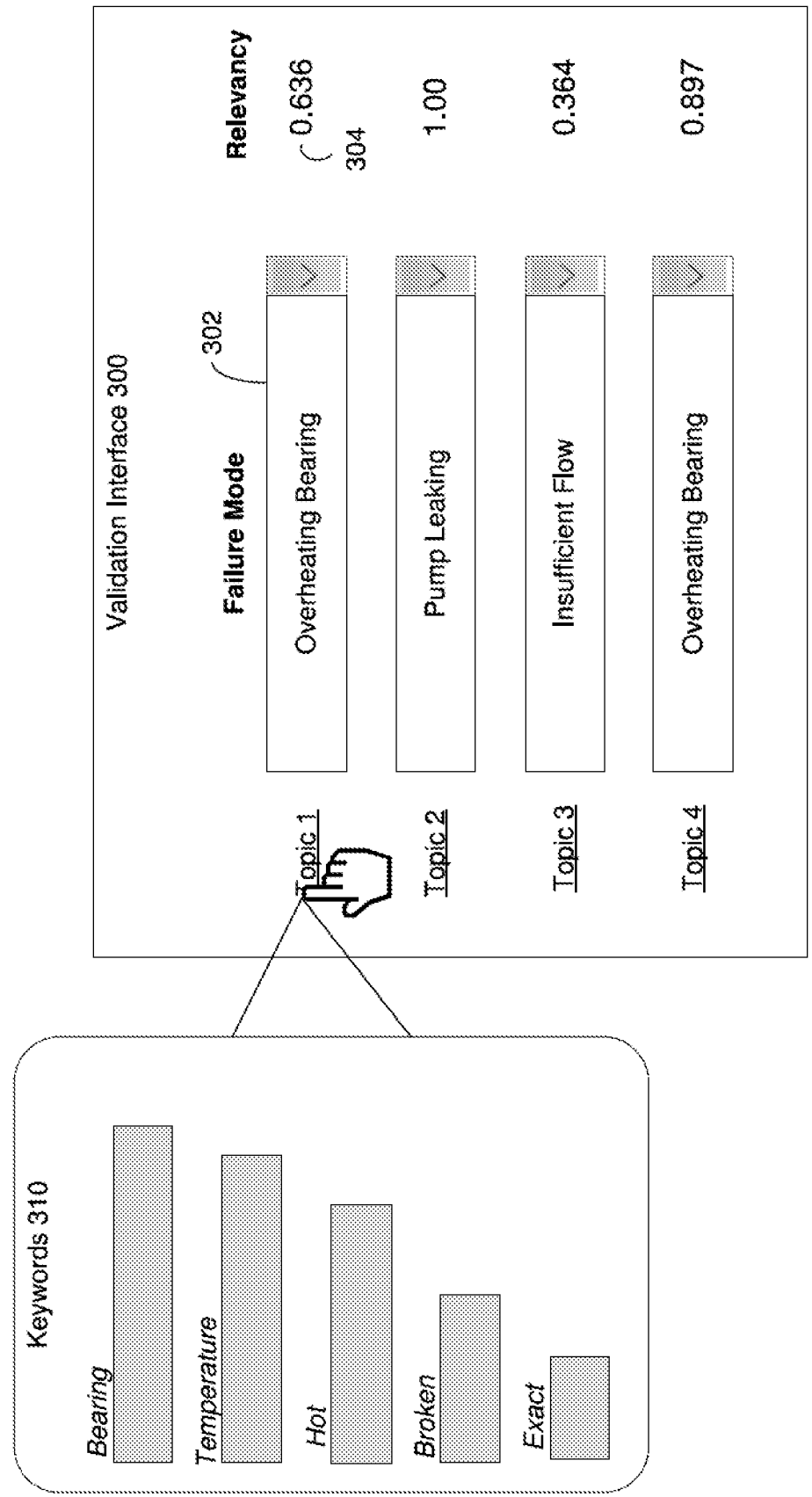
FIG. 3 is a diagram illustrating a user interface for validating a topic model created through unsupervised learning in accordance with an example embodiment.

FIG. 3 illustrates a user interface 300 for validating a topic model created through unsupervised learning in accordance with an example embodiment. After the unsupervised learning process is performed, the trained unsupervised model may be stored in the FMA database 215, and a validation user interface 300 may be output to a display screen of a user device (e.g., user device 130 in FIG. 1, etc.) The user interface 300 includes a listing of the top (most common) topics that were identified and a failure mode 302 and a relevance 304 that has been determined for each topic. Here, the failure mode 302 may be a dynamically reconfigurable failure mode with different types. In the example of FIG. 3, three types of failure mode 302 are shown (overheating bearing, insufficient flow, and pump leaking). The user interface 300 includes drop-down boxes in this example allowing a user to change the assigned failure mode 302. Here, the initial failure modes 302 may be automatically determined by the system, and the user may have a chance to review and confirm the failure mode assignment, or change the failure mode assignment if necessary. The relevance score 304 provides a score representing the likelihood of the initial failure mode to topic assignment made by the system.

Additional data may be shown to the user. For example, if a user clicks on a topic (e.g., topic 1), additional details may be revealed. In this example, a pop-up window 310 is displayed which identifies a list of top keywords associated with the topic which are identified by the system from the notifications. Each keyword may include a chart or other indicator which provides a degree of relevance to the topic.

Once the unsupervised model is validated, the user may choose to perform a supervised learning process based on the unsupervised model. Here, the user may pick the unsupervised model which has been trained (and validated), and pick another training time period (From and To), and train the model again. During the supervised phase, the system may perform supervised learning to do an ensemble learning. Once this model is ready there is a batch or scheduled process for scoring new notifications.

Figure 4A:
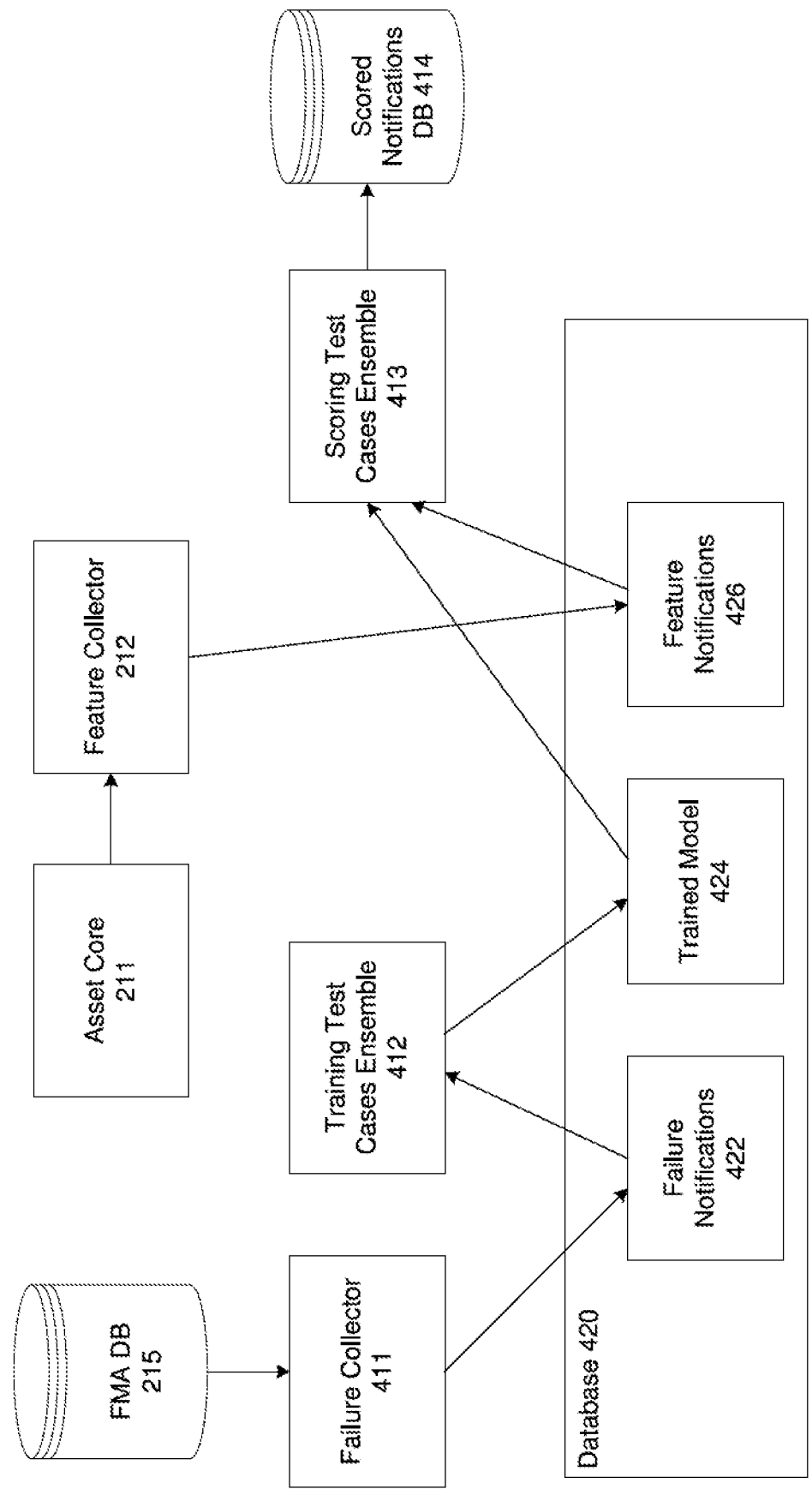
FIG. 4A is a diagram illustrating a system for scoring a text classification model for asset health via supervised learning in accordance with an example embodiment.

FIG. 4A illustrates an example of a system 400 performing supervised learning on the model for failure mode analytics, in accordance with an example embodiment. Referring to FIG. 4A, a failure collector 411 collects failure information associated with an asset from the FMA DB 215. A failure mode is a probable failure that could occur to piece of equipment. A manufacturer may share the failure modes with an operator; else the operator may upload or enter the failure modes on their own. The failure mode keeps the operator informed about possible failures and helps them to handle the failure modes efficiently. A failure mode may be associated with a subclass and may have more than one category. Examples of failure modes that can occur to any of the following business objects associated with a piece of equipment (equipment, models, spare parts, locations, groups) include, but are not limited to, a design function not being obtained, a specified function being lost or outside accepted operational limit, non-critical failures and the like. The failure notifications 422 may be stored in the database 420.

A training test cases ensemble component 412 may conduct automatic supervised classification on text data using ensemble agreement between multiple classification algorithms that makes a prediction concerning the label/class that is assigned to a notification. The training function may use an ensemble of different algorithms, for example, SVM, supervised LDA, boosting, random forests, Glmnet, decision trees, neural networks, maximum entropy, and the like, to generate a consensus on assigning categories to documents. The result is a trained supervised model 424 which can be stored in the database 420. In addition, a scoring test cases ensemble component 413 may makes predictions (e.g., scoring) based on the fitted ensemble trained model 424 to predict the class (label) of a new notification which may be collected by the feature collector 212 and stored in the database as features 426. The results may be stored in a scored notifications database 414.

FIG. 4B illustrates a user interface 450 showing insights of a scored text classification model (resulting from the supervised phase) in accordance with an example embodiment. Referring to FIG. 4B, the user interface 450 includes a plurality of top failure modes 452, 454, and 456, along with metrics associated with each. In this example, the top three failure modes are identified (overheating bearing 452, insufficient flow 454, and pump leaking 456.) The failure modes can be identified per equipment. As another example, failure modes can be identified at an equipment model level. The number of top failure modes displayed may be different than three. Each failure mode card provides a button to navigate to the failure mode analytics details page. The details page provides a new mapping/link between human entered text to topics with top words and failure modes that didn't exist previously. It also provides a new mapping/link between failure modes and the most relevant maintenance documents.

In addition to the failure modes 452, 454, and 456, the system may also generate and display insights such as failure metrics and KPIs. For example, a MTTR (Mean Time To Repair), MTTF (Mean Time to Failure), and MTBF (Mean Time Between Failure=The sum of MTTR+MTTF) at the equipment level may be calculated for each failure mode using the actual uptime and number of failures based on the actual notification data for all equipment of the model. These figures may be calculated based on all failures that lay entirely within the selected time range. Failures that started outside and ended inside, for example, are not taken into account. Although not shown, insights may also include other identified attributes including top words and maintenance documents for failure modes, root causes for each failure mode, bad actors, and the like. Furthermore, the system may enable pro-active maintenance planning, provide input to auto-assign failure modes to incoming maintenance documents (e.g. notifications), provide input for on-going prescriptions to failure prediction and anomaly detection, provide input for leading indicators, provide input for survival models, and the like.

FIG. 5 illustrates a method 500 for generating a model for failure mode analytics in accordance with an example embodiment. For example, the method 500 may be performed by a web server, an asset controller, a server, a cloud platform, a user device, and/or the like. Referring to FIG. 5, in 510, the method may include receiving a request to create a machine learning model for failure mode detection associated with an asset. For example, the request may be a request to create a new model from scratch, a request to modify an existing model that was previously recorded, and the like. The machine learning model may be used to predict a failure mode from notification text associated with the asset.

In 520, the method may include retrieving historical notification data of the asset. For example, the historical notification data may include work orders, notifications, service repairs, error codes, and the like, which are associated with the operation of the asset. In 530, the method may further include generating an unsupervised machine learning model via unsupervised learning on the historical notification data. For example, the unsupervised learning may include identifying failure topics from text included in the historical notification data and mapping the identified failure topics to a plurality of predefined failure modes for the asset. Furthermore, in 540, the method may further include storing the generated unsupervised machine learning model via a storage device.

In some embodiments, the method may further include generating a log that includes failure mode data identified during the unsupervised learning and notifications used during the unsupervised learning and storing the generated log and the notifications in the storage device. The failure mode data may include an identification of the failure modes (e.g., a number/amount of failure modes) and an identification of the notifications (e.g., a number/amount of notifications, etc.) which are processed during the unsupervised learning. In some embodiments, the method may further include displaying a validation interface which includes a failure topic identified during the unsupervised learning and keywords and a failure mode associated with the failure topic. In some embodiments, the method may include receiving user feedback input via the validation interface, and modifying one or more of the keywords and the failure mode associated with the failure topic based on the received user feedback. In some embodiments, the method may further include retrieving new notification data associated with the asset, and generating a supervised machine learning model via supervised learning on the new notification data. For example, the generating the supervised machine learning model may include executing the unsupervised machine learning model on the new notification data and scoring results of the execution.

According to various aspects, the asset may include a machine or an equipment for manufacturing, and the predetermined failure modes may include standard modes of failure for the machine or the equipment. In some embodiments, the method may further include determining a plurality of most common failure modes of the asset and root causes of the plurality of most common failure mode, and outputting the plurality of most common failure modes and the root causes for display via a user interface. In some embodiments, the method may further include determining and displaying one or more key performance indicators of the plurality of most common failure modes for the asset.

Figure 6:
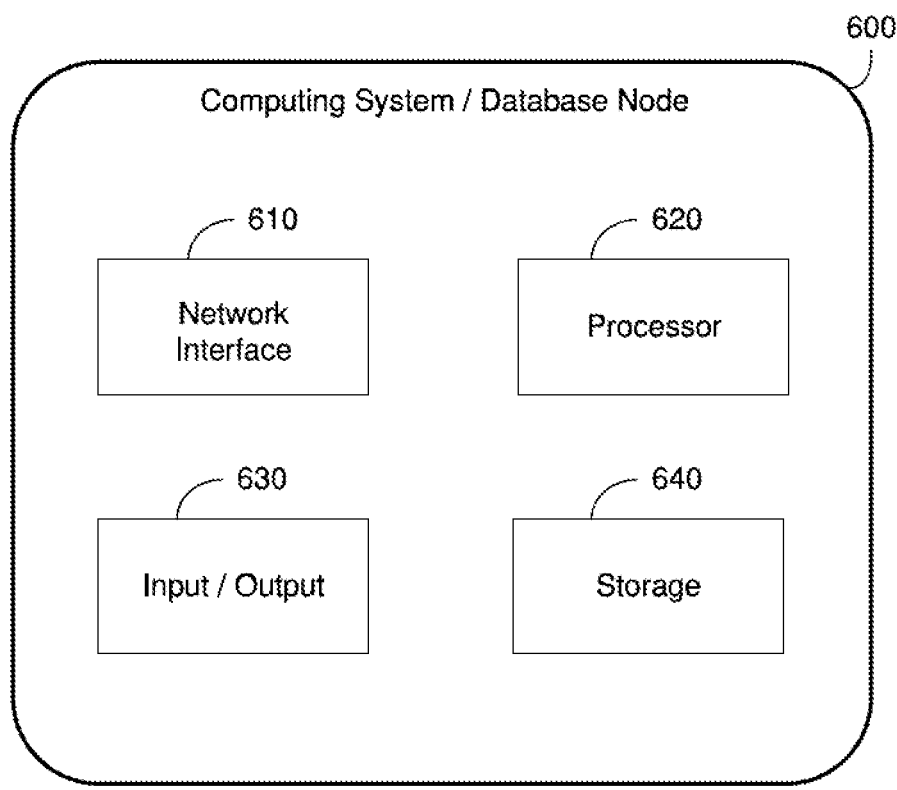
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 6. According to various embodiments, the storage 640 may include a data store having a plurality of tables, partitions and sub-partitions. The storage 640 may be used to store notifications created from an asset activity.

According to various embodiments, the storage 640 may store historical notification data of an asset. The processor 620 may receive a request to create a machine learning model for failure mode detection associated with an asset. The request may include to create a new model from scratch, or configure an existing model. The processor 620 may generate an unsupervised machine learning model via unsupervised learning during which the processor identifies failure topics from text included in the historical notification data and maps the identified failure topics to a plurality of predefined failure modes for the asset. Furthermore, the processor 620 may store the generated unsupervised machine learning model via the storage 640.

In some embodiments, the processor 620 may generate a log comprising failure mode data identified during the unsupervised learning and notifications used during the unsupervised learning, and store the generated log and the notifications in the storage. In some embodiments, the processor 620 may output a display of a validation interface comprising a failure topic identified during the unsupervised learning and keywords and a failure mode associated with the failure topic. In some embodiments, the processor 620 may receive user feedback input via the validation interface, and modify one or more of the keywords and the failure mode associated with the failure topic based on the received user feedback.

In some embodiments, the processor 620 may retrieve new notification data associated with the asset, and generate a supervised machine learning model via supervised learning on the new notification data. In some embodiments, the processor 620 may generate the supervised machine learning model via execution of the unsupervised machine learning model on the new notification data and score results of the execution. In some embodiments, the processor 620 may determine a plurality of most common failure modes of the asset and root causes of the plurality of most common failure mode, and output the plurality of most common failure modes and the root causes for display via a user interface. In some embodiments, the processor 620 may determine and display one or more key performance indicators of the plurality of most common failure modes for the asset.

Figure 7:
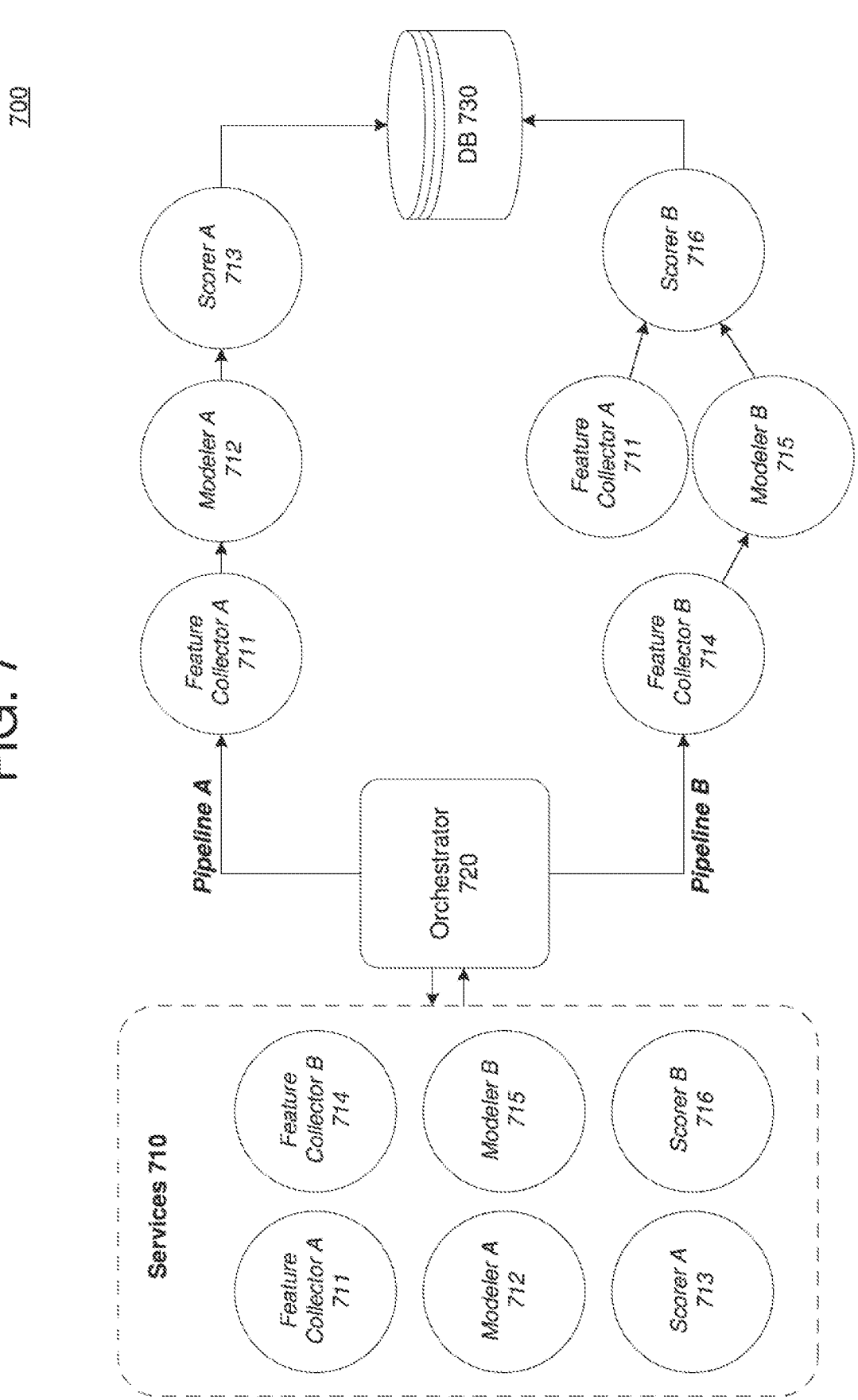
FIG. 7 is a diagram illustrating an example of an orchestrator managing a plurality machine learning pipelines, according to example embodiments.

FIG. 7 illustrates an example of an orchestrator 720 managing a plurality machine learning pipelines, according to example embodiments. For example, the orchestrator 720 may be the FMA instructor 210 shown in FIG. 2A, however, embodiments are not limited thereto. Referring to FIG. 7, the orchestrator 720 can manage various pipelines (e.g., pipelines A and B, etc.) for executing processes for training a machine learning model. The pipelines may perform unsupervised learning, supervised learning, a combination thereof, and the like, on a machine learning model such as a failure mode analytical model (e.g., topic model, text classification model, etc.) described herein.

The orchestrator 720 may manage a plurality of services 710 which are each configured to perform a function of an analytic engine. The orchestrator may trigger execution of each step of a pipeline and carry forward data (e.g., semantics, etc.) based on the previous step of the pipeline. In this example, the services 710 include feature collectors 711 and 714, modelers 712 and 715, and scoring modules 713 and 716. It should also be appreciated that other services may be provided. Each service may be a stand-alone self-sufficient software program that can perform a function of the pipeline based on semantic values that are provided from a previous service. The orchestrator 720 may trigger an ordered execution of one or more of the services 710 based on predefined rules and/or instructions. The orchestrator 720 may include a list of instructions in a sequential order with rules and semantics of how to carry forward various tasks.

In the example of FIG. 7, a first pipeline (pipeline A) includes three services (feature collector 711, modeler 712, and scorer 713) for training a topic model. The orchestrator 720 may trigger execution of the feature collector 711 to collect features of data from historical data set(s) for training a topic model. Here, the user may select an algorithm (or the system may provide one by default) via a user interface, and in response, the orchestrator 720 may trigger the feature collector 711 to collect the training data from a particular time range. Once the data is acquired, the orchestrator 720 may instruct the feature collector 711 as to whether it is transient in nature or should store the data in a storage such as a temporary data store.

Once the feature collector 711 is finished, the orchestrator 720 may trigger execution of the modeler 712. Here, the modeler may be a topic modeler in the examples of a failure mode analytics, but the embodiments are not limited thereto. The orchestrator 720 may carry forward semantics to be used by the modeler 712 such as model type, equipment, algorithm, stop words, etc. and trigger the modeler 712 to use execution logic to calculate results based on the collected data. These results create output files which are what can be consumed in various ways. Next, the orchestrator 720 may instruct the scorer 713 to parse the results output by the modeler 712 based on semantics, and store the results in namespace tables in the database 730.

The orchestrator 720 includes instructions that are configurable. Once the models are executed, the orchestrator 720 may store the results in the database 730. Each of the services 710 that are executed may be different microservices that are executed on their own and orchestrated by the orchestrator 720 based on semantics and rules that are configurable. The software is essentially a mashup of microservices. Under the hood everything is a pipeline getting executed using an engine. Therefore, a user does not feel like the microservices are different, but they are. They are performance intensive. But a business user would see the results as a uniform flow.

Prior to moving to the second pipeline (pipeline B), the orchestrator 720 may control a user interface for enabling a user to provide validation feedback of the trained model. The orchestrator 720 may include an instruction indicating that once the training process implemented by pipeline A (e.g., unsupervised learning) is completed, the orchestrator 720 may create validation tasks. Here, the orchestrator 720 may determine that the unsupervised learning is a success, and trigger an application to perform the validation. An example of the user interface display sequence by the orchestrator 720 is further described with respect to the example shown in FIG. 9. When the validation tasks are done, the orchestrator 720 may move the analytic engine to the second pipeline (pipeline B) which may be the supervised learning.

The first pipeline performs unsupervised learning that is done via a same or similar pipeline as the supervised learning. Here, the unsupervised learning may create a model that is based on a hypothesis which can then be validated. Then, through a second pipeline (e.g., supervised learning) the analytic engine may perform ensemble learning with a new data set. In this example, the second pipeline includes feature collection 714, feature collection 712, modeler 715, and scorer 716. In some examples, the first pipeline and the second pipeline may share one or more services in common (e.g., feature collector 711, etc.) but embodiments are not limited thereto.

In this example, the unsupervised learning performed during the first pipeline may not have a scoring set, just a training set. The supervised learning implemented by pipeline B may use the text classification model (trained) to perform ensemble learning using the output of a trained topic model to train the text classification model again and score it. The scoring is done using the supervised learning. It takes the raw trained model and uses the results from the unsupervised learning and massages it based on the validation feedback to create the correct model and score it accordingly. In the supervised learning pipeline, the system creates an ensemble learning based on the unsupervised learning (correct or use as is) therefore the system can create an improved model and score it based on the new data coming in. The orchestrator 720 triggers sequential execution of the different services in the second pipeline. Also, the orchestrator 720 may carry forward semantics needed at each service. In this example, the second pipeline includes two services which perform feature collection. For example, feature collector 714 may collect failure data and feature collector 711 may collect notification data, both of which can be used to perform supervised learning.

Figure 8:
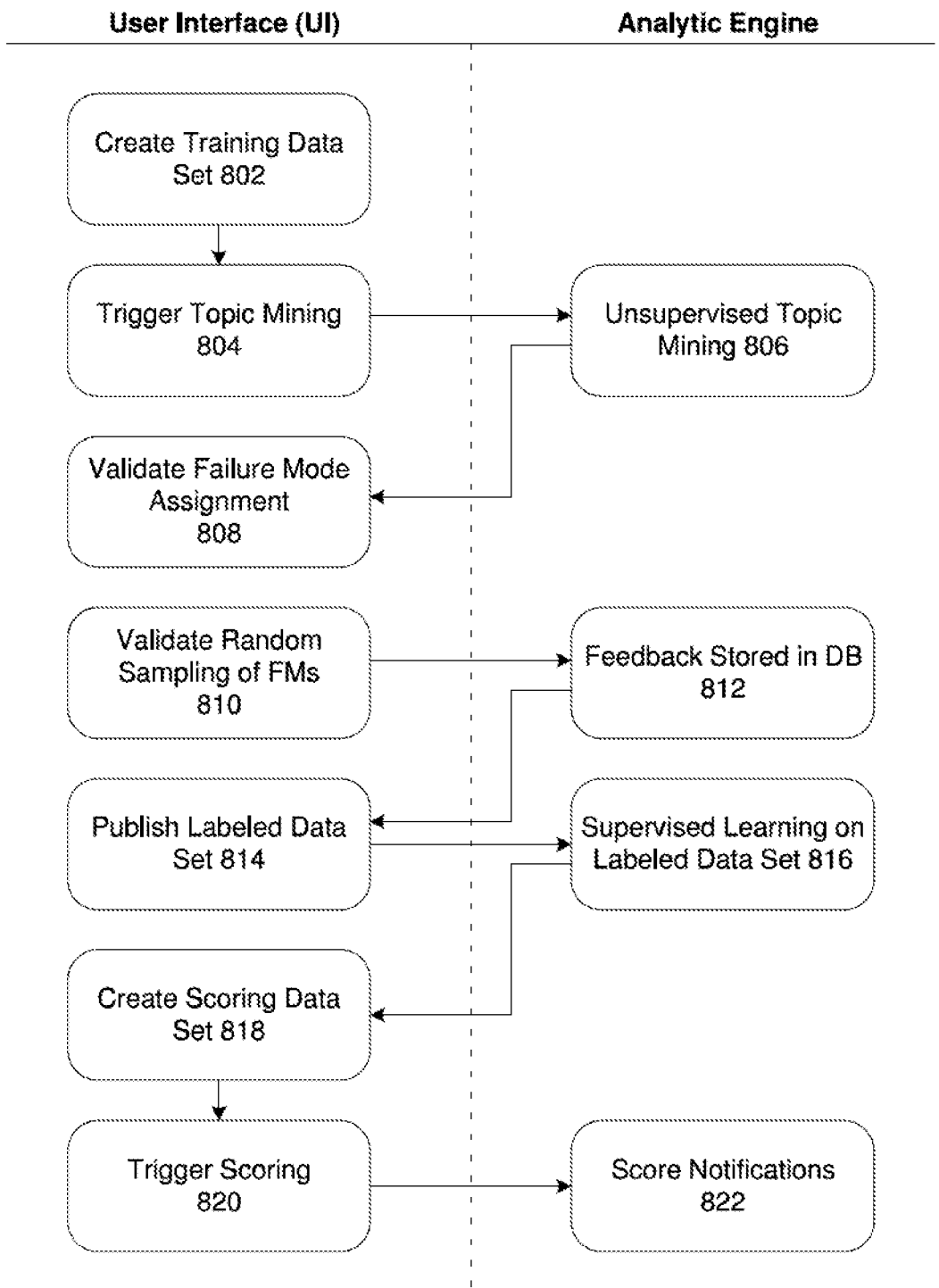
FIG. 8 is a diagram illustrating an example of user interface actions, according to example embodiments.

FIG. 8 illustrates an example of a sequence 800 of user interface actions, according to example embodiments. Referring to FIG. 8, the sequence 800 includes user interface actions which trigger corresponding analytic engine response (e.g., via the orchestrator 720 shown in the example of FIG. 7). In this example, in 802 a user creates a training data set by selecting a time range of historical data. After the features are collected for the training data set, in 804 the user may trigger topic mining via a selection on the user interface. In response, in 806, the analytic engine may perform unsupervised learning on the training data via the machine learning pipeline to identify topics. Furthermore, the analytic engine may map the identified topics to predetermined failure modes.

In 808, the user interface may display a list of topic to failure mode mappings and enable the user to provide feedback. According to various aspects, the user may change or modify the topic to failure mode mappings, or leave them as is. In 810, the user may submit any changes made to the topics to failure modes mappings. In response, in 812, the analytic engine may transmit the user feedback (including any changes made by the user) to a database associated with the machine learning pipeline. In 814, the user may select to publish the labeled data set based on any changes that are made during the validation. In response, in 816, the analytic engine may perform supervised learning via the machine learning pipeline based on the published data set. The resulting trained model may be stored for scoring. Furthermore, in 818, the user may select a scoring data set (such as through a range of time of historical data), and the user may select to score the model, in 820. Furthermore, the analytic engine may generate the scoring results and store them in the database.

FIG. 9 illustrates a method 900 for training a model via a machine learning pipeline according to example embodiments. For example, the method 900 may be performed by a computing device (e.g., the computing system 600 in FIG. 6, etc.) such as a web server, a cloud platform, a user device, a database, or the like. Referring to FIG. 9, in 910, the method may include receiving an identification of a machine learning model. For example, the user may select to create a new model or select to train an existing model. In some embodiments, the model can be a machine learning model for failure mode analytics such as a topic model, a text classification model, or the like.

In 920, the method may include executing a machine learning pipeline which includes a plurality of services which train the machine learning model via at least one of an unsupervised learning process and a supervised learning process. According to various embodiments, the machine learning pipeline may be controlled by an orchestration module that triggers ordered execution of the services. In 930, the method may include storing the trained model output from the machine learning pipeline in a database associated with the machine learning pipeline.

In some embodiments, the executing the machine learning pipeline may include triggering, via the orchestration module, sequential execution of a feature collection service, a modeling service, and a score persistence service. Here, the machine learning pipeline may be used to perform the unsupervised learning. In some embodiments, the executing comprises executing the unsupervised learning process during a first training of the topic model and sequentially executing the supervised learning process during a second training of the text classification model. For example, the unsupervised learning process and the supervised learning process may share one or more common services in the machine learning pipeline. In some embodiments, the sequentially executing of the supervised learning process may include performing an ensemble learning process on the text classification model which uses the scoring output of the topic model.

In some embodiments, the method 900 may further include outputting, via the orchestration module, a user interface for validating the trained topic model. For example, the user interface may receive feedback from the user for validating and/or changing any of the topic mappings generated during the unsupervised learning by the machine learning pipeline. Furthermore, the completion of the validation may cause the orchestration module to trigger execution of the supervised learning process in response to completion of the unsupervised learning process. The services that are used to perform the functionality of the unsupervised learning and the supervised learning may be self-sufficient stand-alone microservices that are executed independently from each other by the processor.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a storage configured to store a plurality of labeled notifications that are labeled with a plurality of different topics labels identified from a plurality of notifications, respectively, each notification being related to a failure associated with an asset; and
a processor configured to:
generating an unsupervised machine learning model via unsupervised learning by mapping, via execution of a topic modeling algorithm that maps, one-to-one, the plurality of topics to a plurality of different predefined modes of failure for the asset, respectively, based on a similarity between text content included in the plurality of labeled notifications and text content included in the plurality of different predefined modes of failure;
display, via a user interface, a mapping between one of the topics and one of the modes of failure;
receive validation of the displayed mapping via the user interface;
integrate the validated mapping into a machine learning model by performing supervised learning on the validated mapping;
store an output of the machine learning model in a storage device; and
execute another machine learning model to assign the plurality of different topic labels to one or more notifications, respectively, to generate the plurality of labeled notifications based on text content that is contained within the one or more notifications.

2. The computing system of claim 1, wherein the processor is further configured to modify the mapping based on an input received via the user interface, and integrate the modified mapping into the machine learning model in the storage.

3. The computing system of claim 1, wherein the plurality of different modes of failure are related to a single physical asset.

4. The computing system of claim 1, wherein the processor is further configured to identify one or more validation tasks based on execution of the topic modeling algorithm and display the one or more validation tasks on the user interface.

5. The computing system of claim 1, wherein the processor is configured to display multiple mappings between multiple topics to multiple modes of failure, respectively, within the user interface along with graphical elements for modifying the multiple mappings.

6. The computing system of claim 1, wherein the processor is configured to detect selection of a link associated with the mapping displayed within the user interface, and in response, display a plurality of keywords that are used by the topic modeling algorithm to generate the mapping.

7. The computing system of claim 6, wherein the processor is configured display weighted values with the plurality of keywords that specify how much weight each keyword is given by the topic modeling algorithm on the mapping.

8. A method comprising:
storing a plurality of labeled notifications that are labeled with a plurality of different topics labels identified from a plurality of notifications, respectively, each notification being related to a failure associated with an asset;
generating an unsupervised machine learning model via unsupervised learning by mapping, via execution of a topic modeling algorithm that maps, one-to-one, the plurality of topics to a plurality of different predefined modes of failure for the asset, respectively, based on a similarity between text content included in the plurality of different labeled notifications and text content included in the plurality of predefined modes of failure;
displaying, via a user interface, a mapping one of the topics and one of the modes of failure;
receiving validation of the displayed mapping via the user interface;
integrating the validated mapping into a machine learning model by performing supervised learning on the validated mapping;
storing an output of the machine learning model in a storage device; and
executing another machine learning model to assign the plurality of different topic labels to one or more notifications, respectively, to generate the plurality of labeled notifications based on text content that is contained within the one or more notifications.

9. The method of claim 8, wherein the method further comprises modifying the mapping based on an input received via the user interface, and integrating the modified mapping into the machine learning model in the storage device.

10. The method of claim 8, wherein the plurality of different modes of failure are related to a single physical asset.

11. The method of claim 8, wherein the method further comprises identifying one or more validation tasks based on execution of the topic modeling algorithm and displaying the one or more validation tasks on the user interface.

12. The method of claim 8, wherein the displaying comprises displaying multiple mappings between multiple topics to multiple modes of failure, respectively, within the user interface along with graphical elements from modifying the multiple mappings.

13. The method of claim 8, wherein the method further comprises detecting selection of a link associated with the displayed mapping within the user interface, and in response, displaying a plurality of keywords that are used by the topic modeling algorithm to generate the mapping.

14. The method of claim 13, wherein the method further comprises displaying weighted values with the plurality of keywords that specify how much weight each keyword is given by the topic modeling algorithm on the mapping.

15. A non-transitory computer-readable medium comprising instructions which when executed by a processor cause a computer to perform a method comprising:
storing a plurality of labeled notifications that are labeled with a plurality of different topics labels identified from a plurality of notifications, respectively, each notification being related to a failure associated with an asset;
generating an unsupervised machine learning model via unsupervised learning by mapping, via execution of a topic modeling algorithm that maps, one-to-one, the plurality of topics to a plurality of different modes of failure for the asset, respectively, based on a similarity between text content included the plurality of different labeled notifications and text content included in the plurality of different predefined modes of failure;
displaying, via a user interface, one of the topics and one of the modes of failure;
receiving validation of the displayed mapping via the user interface;

integrating the validated mapping into a machine learning model by performing supervised learning on the validated mapping;

storing an output of the machine learning model in a storage device; and executing another machine learning model to assign the plurality of different topic labels to one or more notifications, respectively, to generate the plurality of labeled notifications based on text content that is contained within the one or more notifications.

16. The non-transitory computer-readable medium of claim 15, wherein the method further comprises modifying the mapping based on an input received via the user interface, and integrating the modified mapping into the machine learning model in the storage device.

17. The non-transitory computer-readable medium of claim 15, wherein the plurality of modes of failure are related to a single physical asset.

* * * * *